(12) United States Patent
Huang et al.

(10) Patent No.: US 8,308,343 B2
(45) Date of Patent: Nov. 13, 2012

(54) BEATER FOR MIXING

(75) Inventors: Joseph C. Huang, Dayton, OH (US);
Dana D. Herbst, Vandalia, OH (US);
David S. Dickey, Dayton, OH (US)

(73) Assignee: Premark FEG L.L.C., Glenview, IL (US)

( * ) Notice: Subject to any disclaimer, the term of this patent is extended or adjusted under 35 U.S.C. 154(b) by 740 days.

(21) Appl. No.: 12/307,932

(22) PCT Filed: Jun. 28, 2007

(86) PCT No.: PCT/US2007/072302
§ 371 (c)(1),
(2), (4) Date: Jan. 15, 2009

(87) PCT Pub. No.: WO2008/008631
PCT Pub. Date: Jan. 17, 2008

(65) Prior Publication Data
US 2009/0310436 A1    Dec. 17, 2009

Related U.S. Application Data

(60) Provisional application No. 60/911,649, filed on Apr. 13, 2007, provisional application No. 60/830,496, filed on Jul. 13, 2006.

(51) Int. Cl.
*B01F 7/00* (2006.01)
(52) U.S. Cl. ............ 366/330.1; 366/343; 366/310; 366/311; 366/312; 366/313; 366/295
(58) Field of Classification Search .............. 366/342, 366/343, 310, 311, 312, 313, 295, 296, 330.1
See application file for complete search history.

(56) References Cited

U.S. PATENT DOCUMENTS
2,042,791 A    6/1936  Martinet
(Continued)

FOREIGN PATENT DOCUMENTS
DE        2029585        12/1971
FR        2123637        9/1972
JP        2000-342951    12/2000
WO        WO 03/101596   12/2003

OTHER PUBLICATIONS
PCT, International Search Report, PCT/US2007/072302 (mailed Feb. 20, 2008; published Apr. 17, 2008).
(Continued)

*Primary Examiner* — Yogendra Gupta
*Assistant Examiner* — Ninh Le
(74) *Attorney, Agent, or Firm* — Thompson Hine LLP

(57) ABSTRACT

A beater for a mixer includes a shaft (14) including a mixer attachment portion (16), the shaft defining a rotational axis (A) of the beater. A first stabilizing arm (18) extends outwardly from the shaft and a second stabilizing arm (20) extends outwardly from the shaft and spaced circumferentially from the first stabilizing arm. A first blade (22) has an upper end connected to the first stabilizing arm at a location spaced from the shaft, a lower end located proximate the rotational axis of the beater and a leading face (40) that transitions from a substantially vertical orientation at the lower end to a downwardly angled orientation at the upper end. A second blade (24) has an upper end connected to the second stabilizing arm at a location spaced from the shaft, a lower end located proximate the rotational axis of the beater and a leading face (42) that transitions from a substantially vertical orientation at the lower end to a downwardly angled orientation at the upper end.

17 Claims, 10 Drawing Sheets

U.S. PATENT DOCUMENTS

| | | | |
|---|---|---|---|
| 3,154,297 A | | 10/1964 | Lövgren |
| 3,314,660 A | * | 4/1967 | Arbiter ........................ 366/289 |
| 3,352,543 A | | 11/1967 | Niederman et al. |
| 3,940,116 A | | 2/1976 | Verlinden et al. |
| 5,556,201 A | * | 9/1996 | Veltrop et al. ................ 366/203 |
| 2005/0105386 A1 | | 5/2005 | Crites et al. |
| 2006/0268659 A1 | * | 11/2006 | Kaas ............................. 366/312 |

OTHER PUBLICATIONS

PCT, Written Opinion of the International Searching Authority (dated Feb. 20, 2008).

International Preliminary Report on Patentability, PCT/US2007/072302 (Jan. 13, 2009).

* cited by examiner

BEATER FOR MIXING

CROSS-REFERENCE TO RELATED APPLICATIONS

This application claims priority to U.S. Provisional Application No. 60/830,496, filed Jul. 13, 2006 and to U.S. Provisional Application No. 60/911,649, filed Apr. 13, 2007, the content of both of which are hereby incorporated by reference as if fully set forth herein.

TECHNICAL FIELD

The present application relates to mixing machines, and more particularly to a beater for a commercial food mixer.

BACKGROUND

Commercial food mixers such as those used in bakeries are frequently of the planetary-type, i.e., a cylindrical bowl is stationarily-supported and a rotating beater moves in orbital fashion within the bowl so that the beater moves close to the cylindrical wall in its orbital passes around the bowl. Various shapes of beating blades have been proposed and used.

SUMMARY

In an aspect, a beater for a mixer includes a shaft including a mixer attachment portion, the shaft defining a rotational axis of the beater. A first stabilizing arm extends outwardly from the shaft and a second stabilizing arm extends outwardly from the shaft and spaced circumferentially from the first stabilizing arm. A first blade has an upper end connected to the first stabilizing arm at a location spaced from the shaft, a lower end located proximate the rotational axis of the beater and a leading face that transitions from a substantially vertical orientation at the lower end to a downwardly angled orientation at the upper end. A second blade has an upper end connected to the second stabilizing arm at a location spaced from the shaft, a lower end located proximate the rotational axis of the beater and a leading face that transitions from a substantially vertical orientation at the lower end to a downwardly angled orientation at the upper end.

In another aspect, a beater for a mixer includes a shaft including a mixer attachment portion, the shaft defining a rotational axis of the beater. A first stabilizing arm extends outwardly from the shaft and a second stabilizing arm extends outwardly from the shaft and spaced circumferentially from the first stabilizing arm. A first outer blade has an upper end connected to the first stabilizing arm at a location spaced from the shaft and a lower end positioned proximate the rotational axis. A second outer blade has an upper end connected to the second stabilizing arm at a location spaced from the shaft and a lower end positioned proximate the rotational axis. A first inner blade has an upper end connected to the first stabilizing arm at a location spaced from the shaft and inward of the upper end of the first outer blade, the first inner blade including and a lower end positioned proximate the rotational axis. A second inner blade has an upper end connected to the second stabilizing arm at a location spaced from the shaft and inward of the upper end of the second outer blade, the second inner blade including and a lower end positioned proximate the rotational axis. The first outer blade, second outer blade, first inner blade and second inner blade include respective leading faces shaped and configured to cooperate during use to produce a mixing pattern in which material being mixed moves upward along the first and second outer blades and then inward and downward along the first and second inner blades.

In another aspect, a beater for mixing food product includes a shaft including a mixer attachment portion, the shaft defining a rotational axis of the beater. A first stabilizing arm extends outwardly from the shaft. A second stabilizing arm extends outwardly from the shaft and is substantially diametrically opposed to the first stabilizing arm such that both the first stabilizing arm and the second stabilizing arm extend generally parallel to a plane in which the rotational axis lies. A first blade has a lower end positioned proximate the rotational axis and an upper end connected to the first stabilizing arm at a location spaced away from the shaft. The lower end of the first blade is proximate the plane, the first blade extends away from the plane, to a first side of the plane, moving upward from the lower end and then extends back toward the plane at the upper end. A second blade has a lower end positioned proximate the rotational axis and an upper end connected to the second stabilizing arm at a location spaced away from the shaft. The lower end of the second blade is proximate the plane, the second blade extends away from the plane, to a second side of the plane, moving upward from the lower end and then extends back toward the plane at the upper end.

The details of one or more embodiments are set forth in the accompanying drawings and the description below. Other features, objects, and advantages will be apparent from the description and drawings, and from the claims.

DETAILED DESCRIPTION

Figure 1:
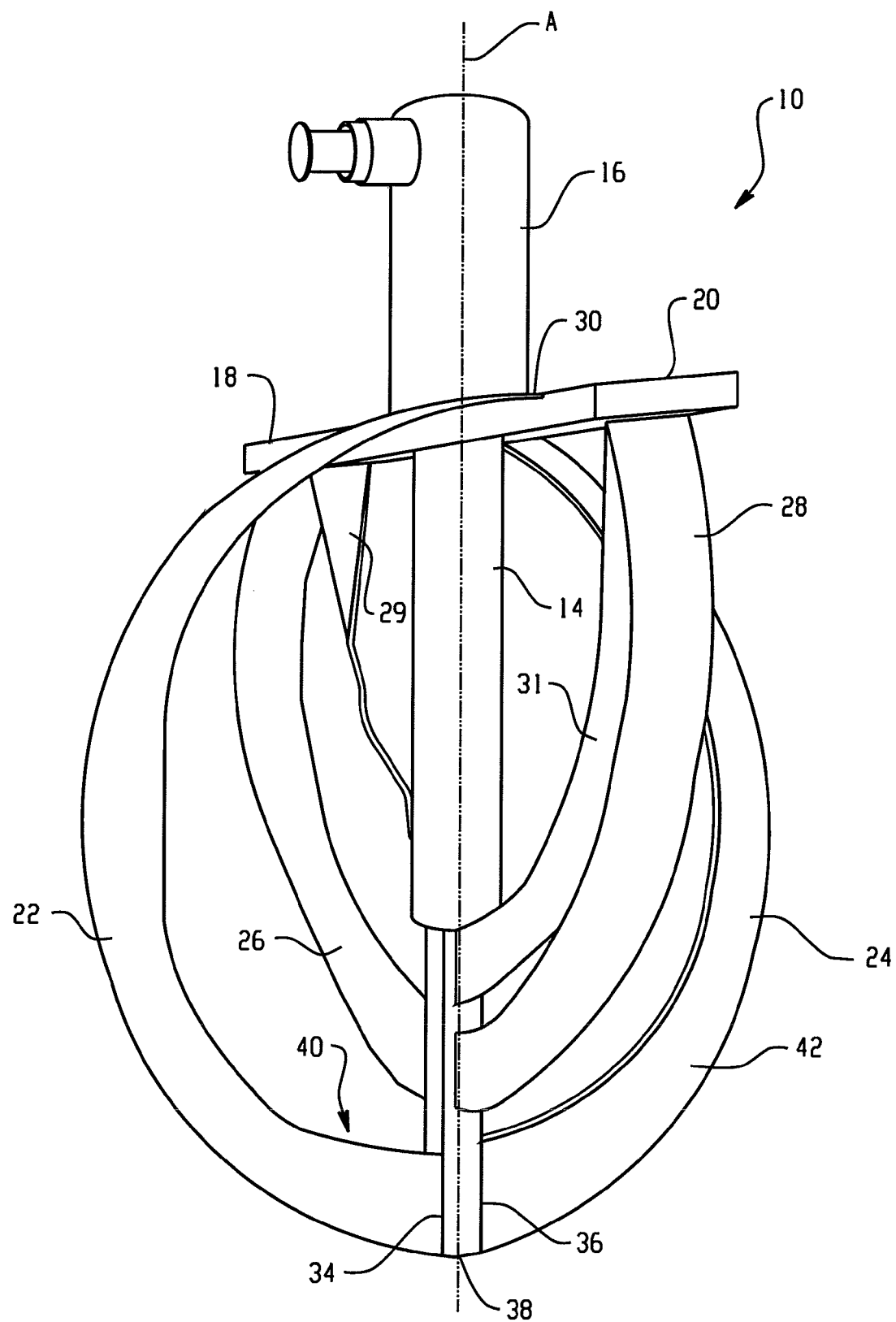
FIG. 1 is a perspective view of an embodiment of a beater.
Figure 2:
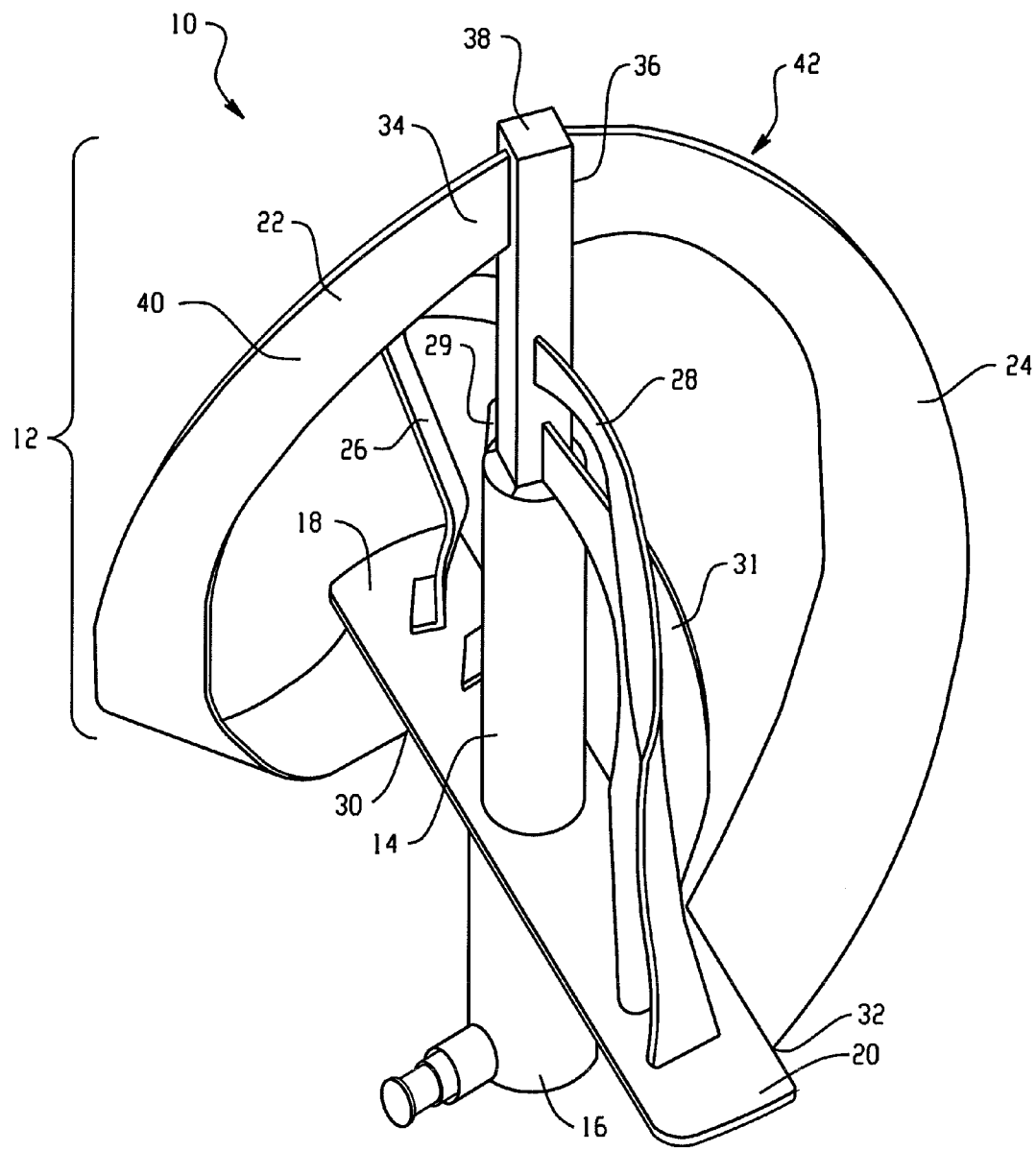
FIGS. 2-4 are inverted, perspective views of the beater of FIG. 1.
Figure 3:
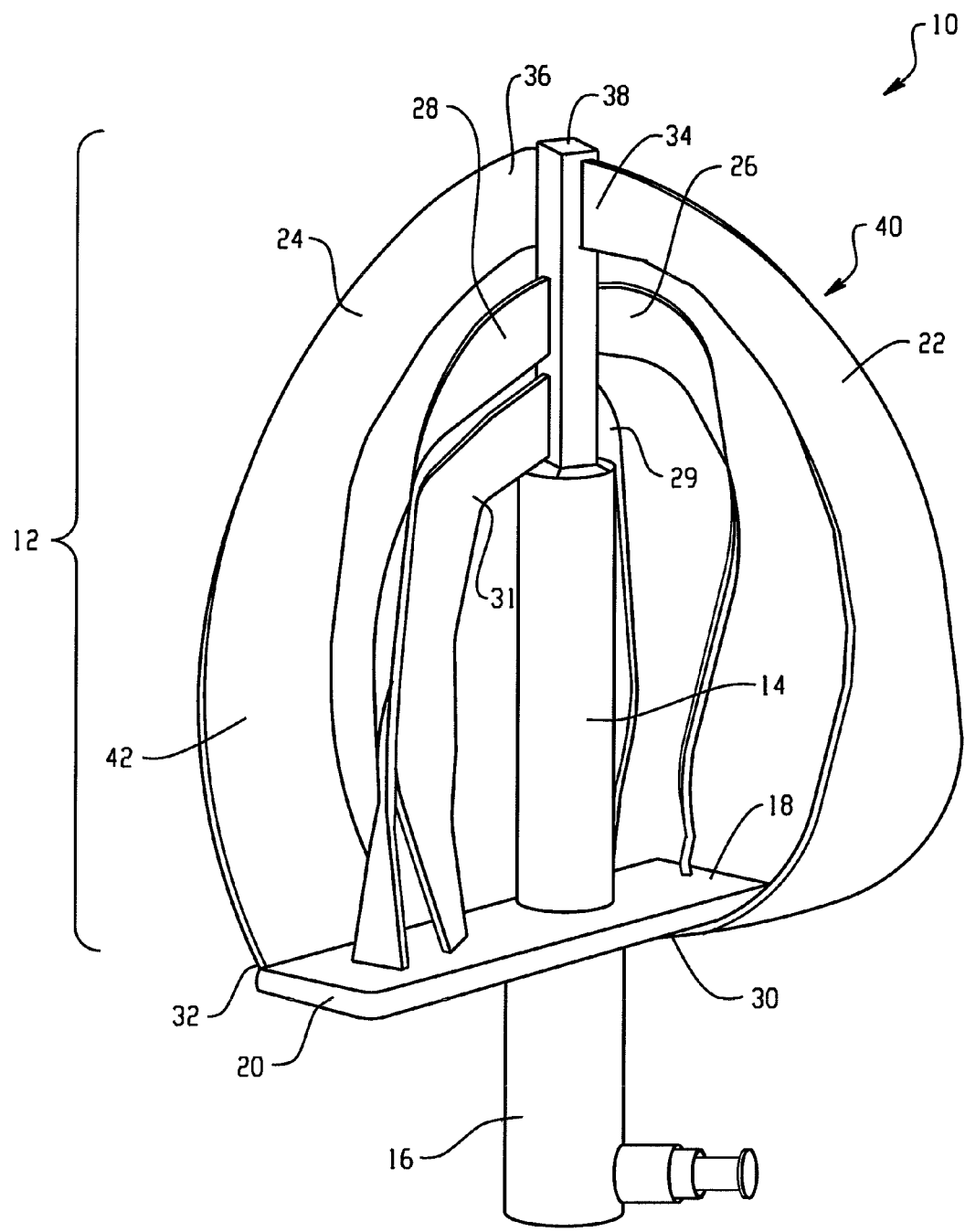
Figure 4:
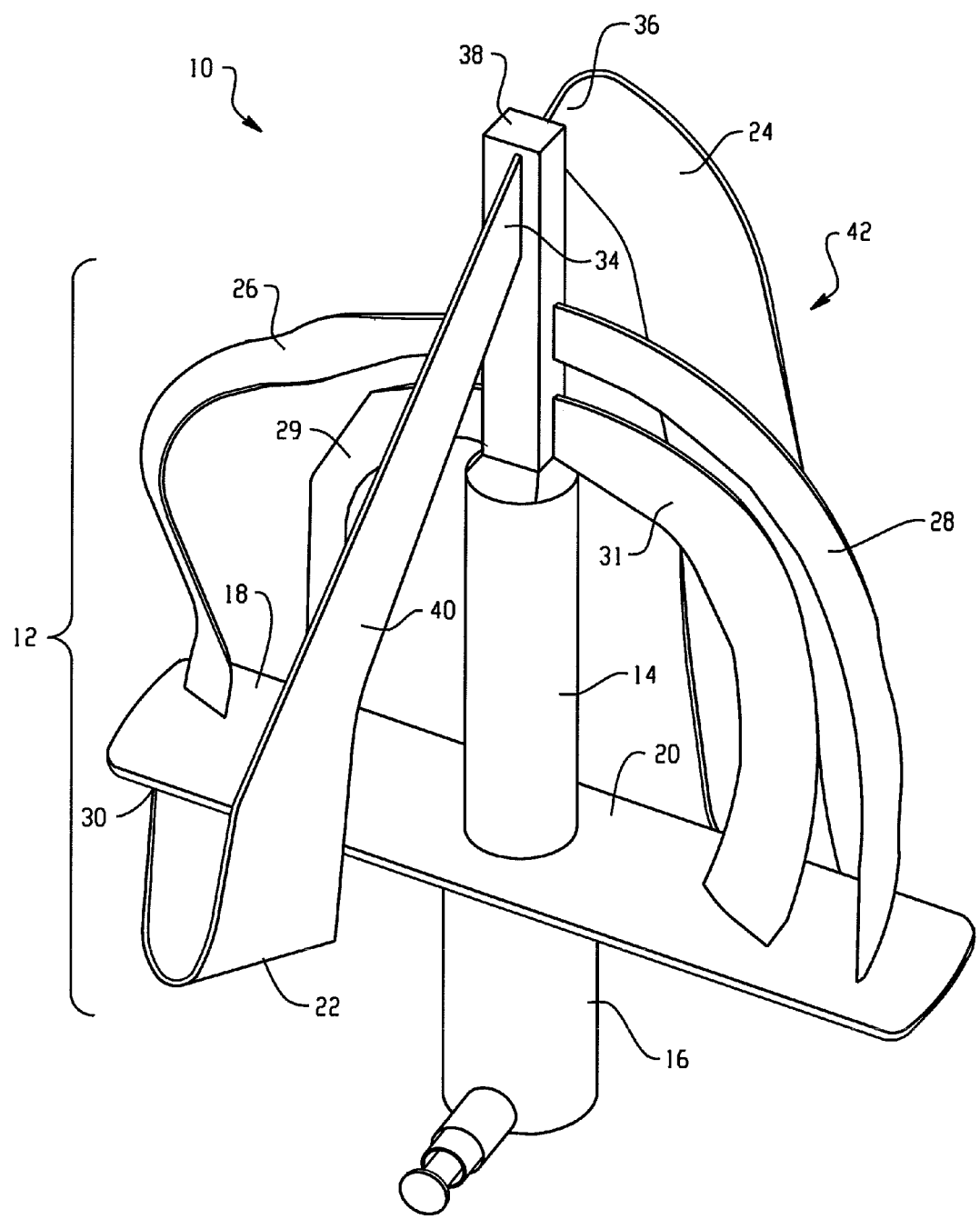

Referring to FIGS. 1-4, a beater 10 for use with a mixing machine is shown in an inverted orientation in FIGS. 2-4 to emphasize a mixing portion 12 of the beater. The beater 10 includes a shaft 14 having an attaching portion 16 that is used to attach the beater to the mixing machine. The shaft 14 defines a longitudinal axis A of the beater 10. A pair of stabilizing arms 18, 20 extend outwardly from the shaft 14 at opposite sides thereof. In some embodiments, the stabilizing arms 18, 20 may be formed by a continuous strip of material (e.g., with an opening formed therethrough that receives the shaft 14), or the stabilizing arms may each be formed of a separate piece of material connected to the shaft. In another embodiment, the arms are cast with the shaft.

The beater 10 also includes a number of blades attached to the stabilizing arms 18, 20. In the embodiment shown, the beater 10 includes a pair of outer blades 22 and 24, a pair of inner blades 26 and 28 and a pair of innermost blades 29 and 31. The outer blades 22 and 24 have a first end 30, 32 connected to a respective stabilizing arm 18, 20 and a second end 34, 36 connected to the shaft 14 at a location near a bottom end 38 of the shaft. At the second end 34, 36, each outer blade 22, 24 includes an outwardly extending portion having a leading face 40, 42 (i.e., the side of the blade facing in the direction of rotation during use) that lies in a substantially upright plane. As each outer blade 22, 24 moves outward and vertically from the longitudinal axis A at an upwardly extending portion, the outer blades 22 and 24 curve such that the leading face 40, 42 transitions toward an upward orientation. The outer blades 22 and 24 then move back toward a plane defined by the stabilizing arms 18, 20 and the curving continues such that the leading face 40, 42 transitions toward a downward orientation at the stabilizing arms 18, 20.

Inner and innermost blades 26, 28, 29, 31 are also provided, with the lower end of blades 26, 28, 29, 31 meeting at the shaft 14 and the upper ends of blades 26, 28, 29, 31 attached to the stabilizing arms 18, 20 arms at intermediate locations thereon. In the illustrated embodiment, the leading faces of the blades 26, 28, 29, 31 are substantially vertically oriented at the shaft 14 and begin to angle downwardly as the blades move radially outward from the axis A and upward toward the arms, though the downward angles of the leading faces of blades 26, 28, 29, 31 are much less than that of outer blades 22 and 24. Moreover, the leading faces of the blades 26, 28, 29, 31 become substantially vertically oriented again near the stabilizing arms 18, 20.

Figure 5:
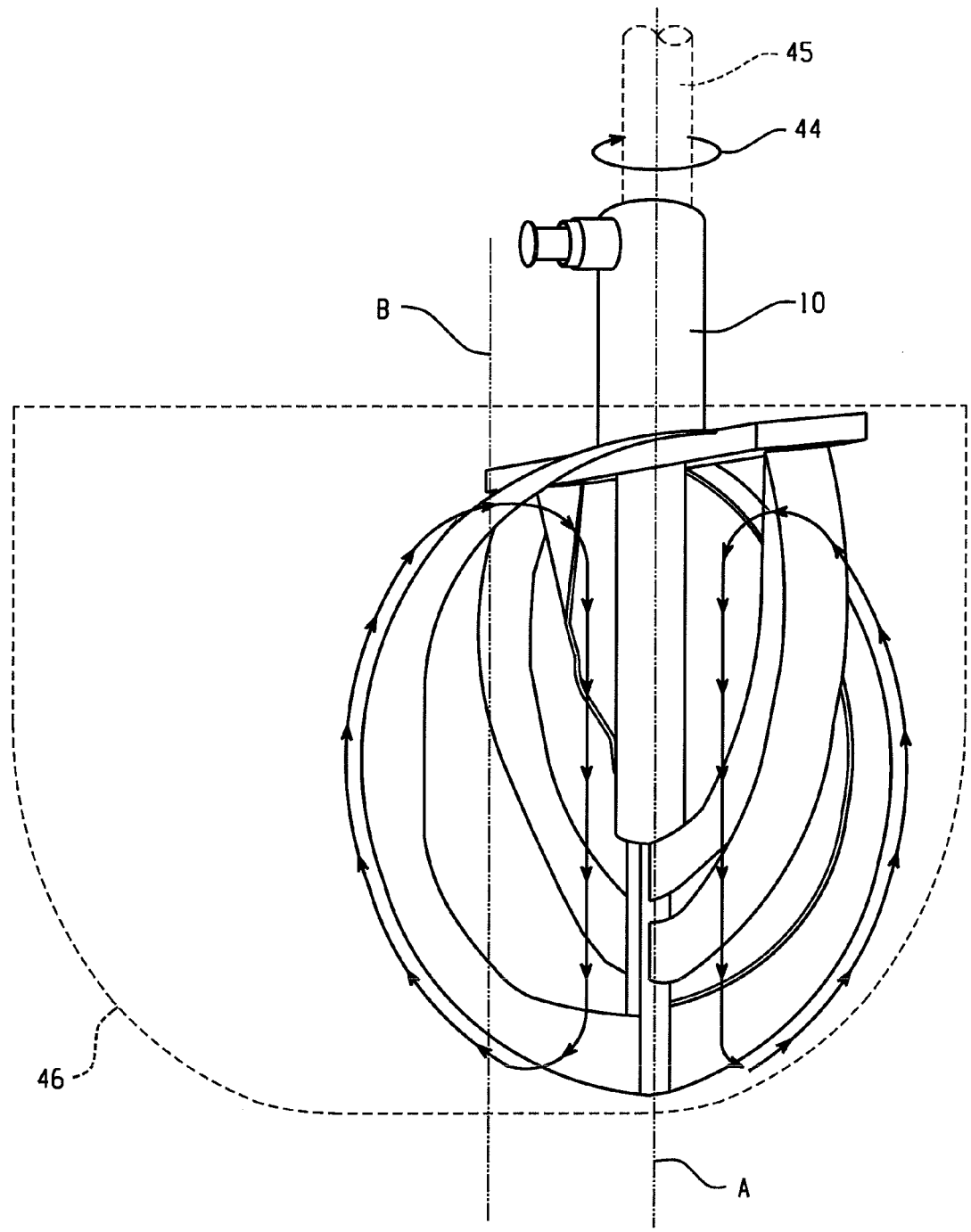
FIG. 5 illustrates the beater of FIG. 1 attached to a shaft of a mixer and located within a mixing vessel.
Figure 6:
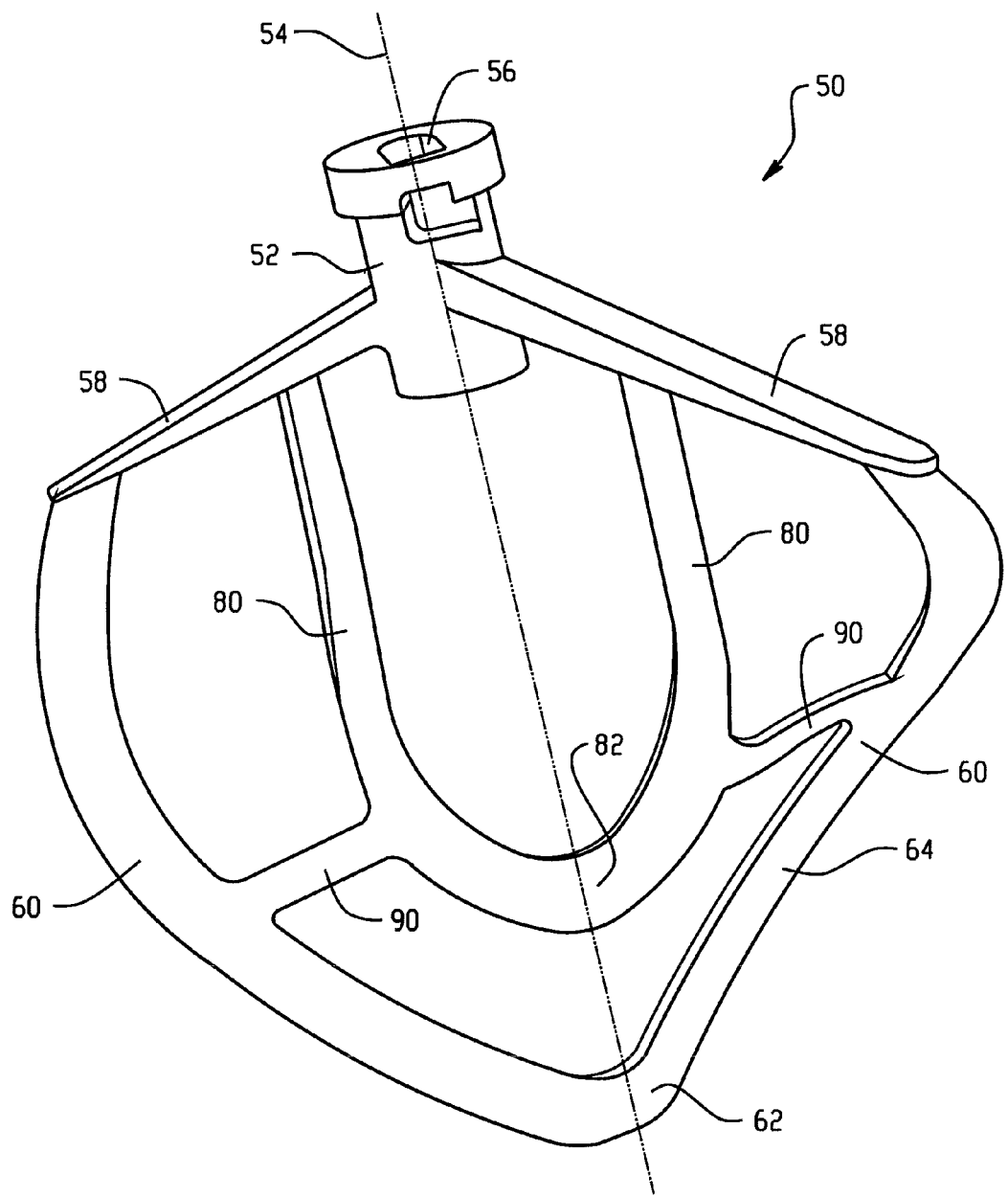
FIG. 6 is a perspective view of another embodiment of a beater.
Figure 7:
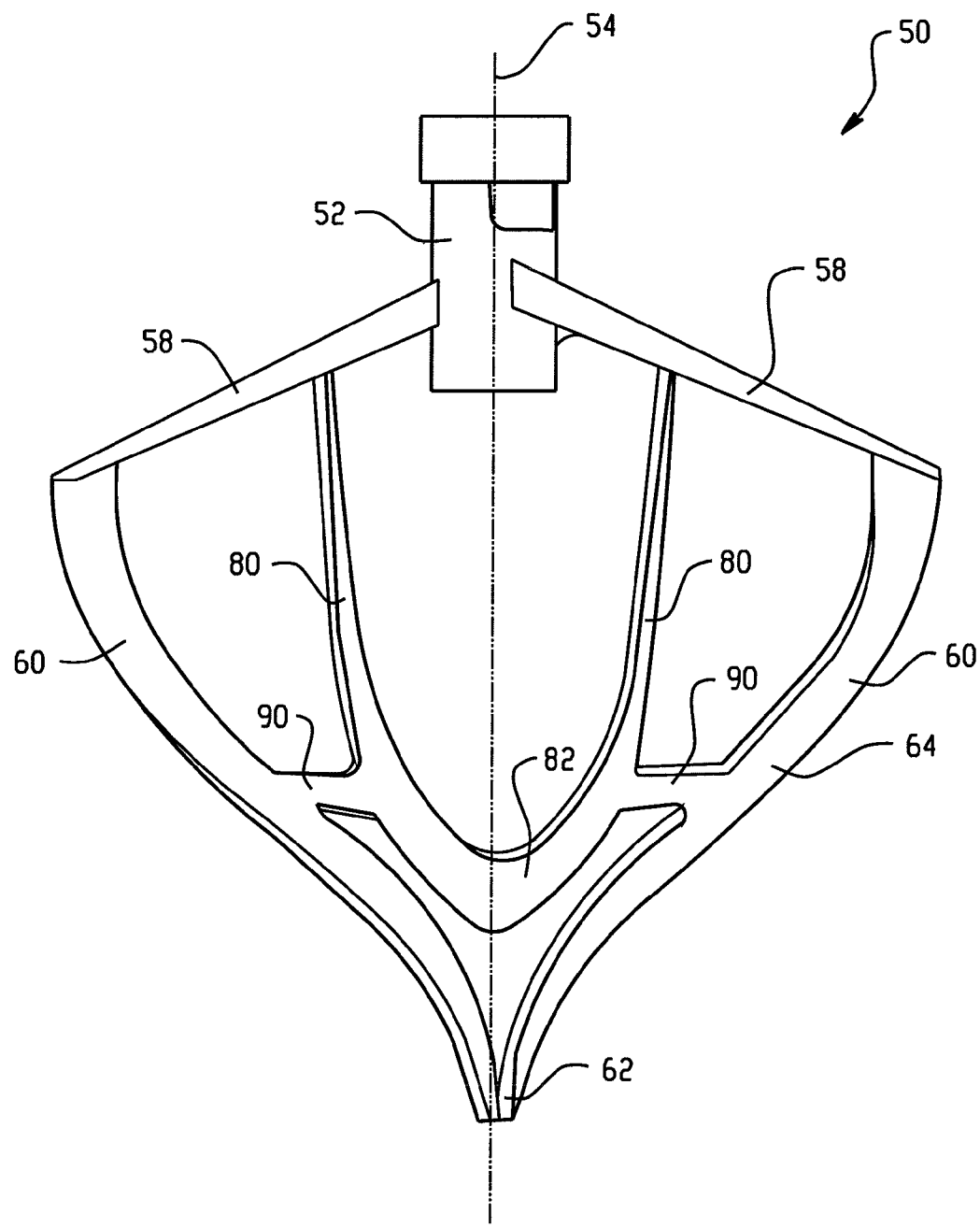
FIG. 7 is a side view of the beater of FIG. 6.

Referring now to FIG. 5, the beater 10 rotates about its longitudinal axis A during a mixing operation. In other embodiments, staggering of the blades may make the arrangement eccentric. Also, while the axis of rotation is illustrated as being vertical, the axis of rotation may be offset from the vertical. In a typical planetary mixer, the longitudinal axis A may follow its own path, such as a orbital motion around a center axis B of the bowl.

FIG. 5 diagrammatically illustrates movement of the material represented by the arrows within a mixing vessel 46 (represented by the dotted lines) during a mixing operation using the beater 10. As the beater 10 rotates in the direction of arrow 44 using shaft 45 of a mixer, a mixing pattern is provided in which material moves upward at the outer portions of the beater 10 (between the beater and the wall of the vessel 46), inward toward the longitudinal axis A and then downward toward the bottom of the vessel. The beater 10 also forces rotation and whirled or spiraling movement of the material closer to the longitudinal axis A of the beater (which is not depicted by FIG. 5). In some instances, the beater 10 imparts a degree of radial force and resulting motion to the material, which can be against the wall of the vessel 46 to increase friction at the wall and create fluid shear because of the relative motion between the beater and the vessel. In some embodiments, the movement of the material in the radial direction is away from the vessel wall, e.g., to reduce any accumulation of unmixed material at the wall of the vessel 46.

The outer and inner blades 22, 24, 26, 28, 29, 31 may be formed of strips, rods, bars, etc. arranged in rows or staggered rows. The outer row of blades 22 and 24 may be curved or shaped to approximate the interior shape of the vessel 46. The clearance between points on the outer blades 22, 24 and the nearest adjacent wall of the vessel 46 may be approximately equal along a length of the outer blade. However, the distance between the outer blades 22, 24 and the vessel 46 wall can be large or small compared to either the beater or vessel diameter, for example, depending on the properties of the material being mixed or other application requirements.

Figure 8:
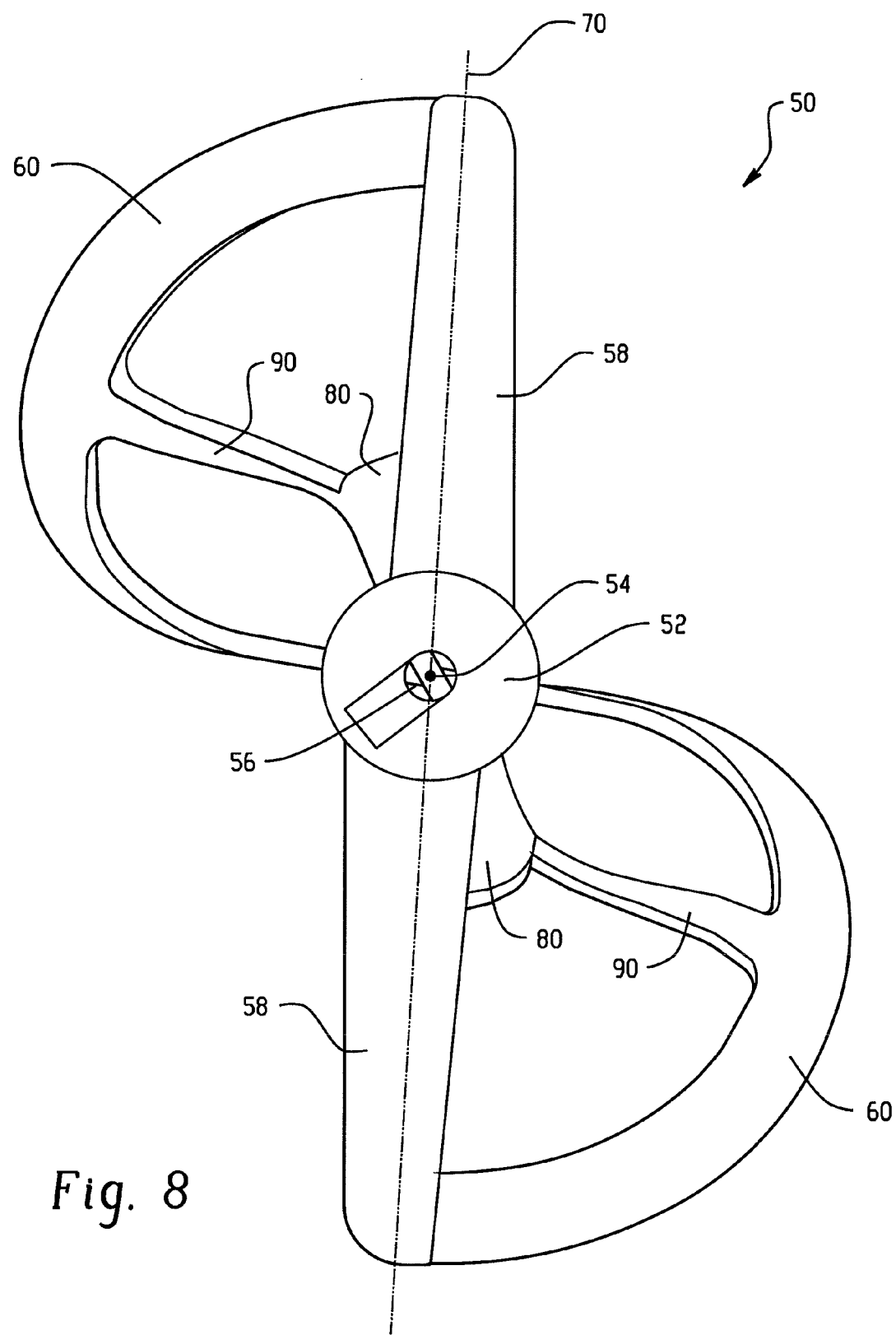
FIG. 8 is a top view of the beater of FIG. 6.
Figure 9:
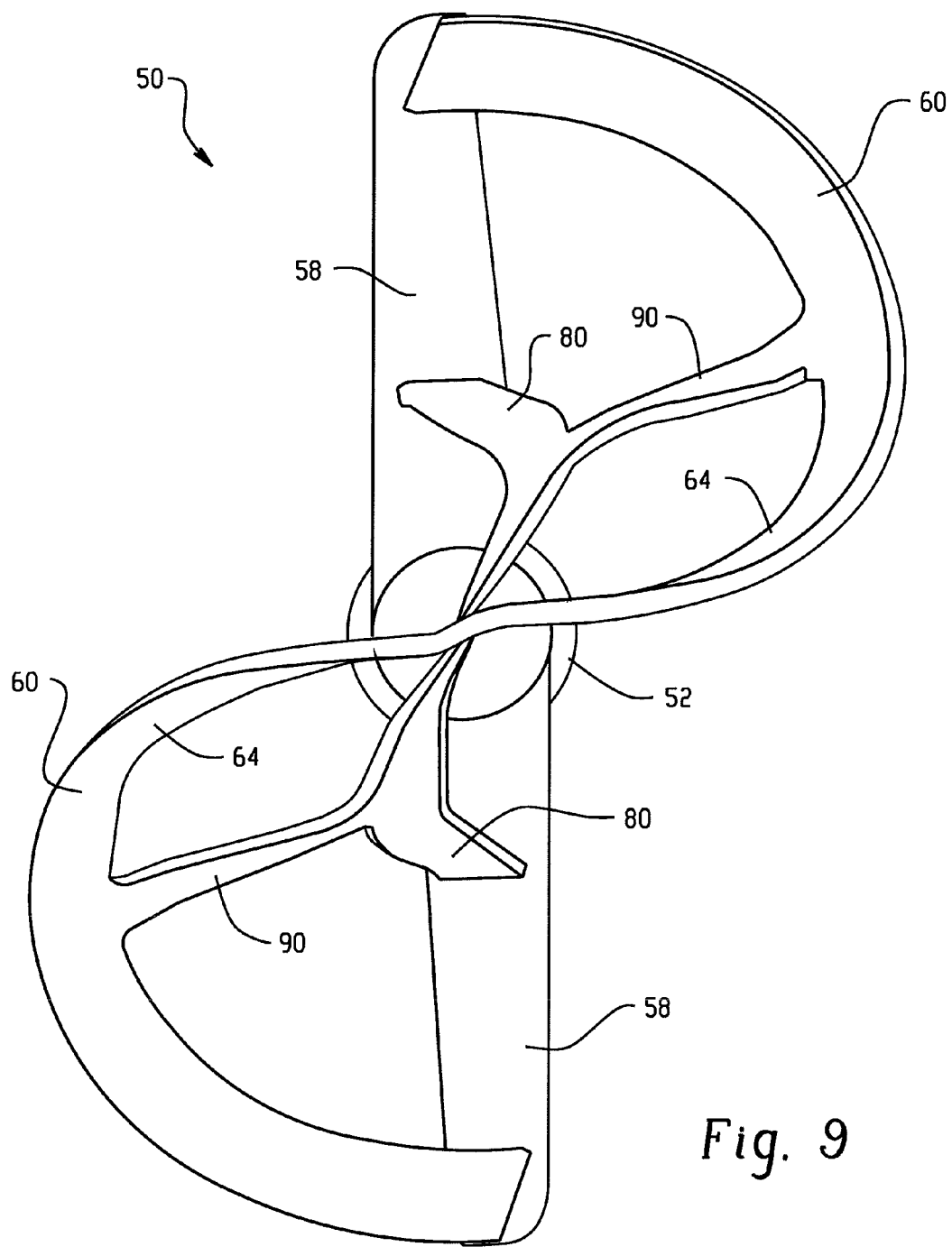
FIG. 9 is a bottom view of the beater of FIG. 6.
Figure 10:
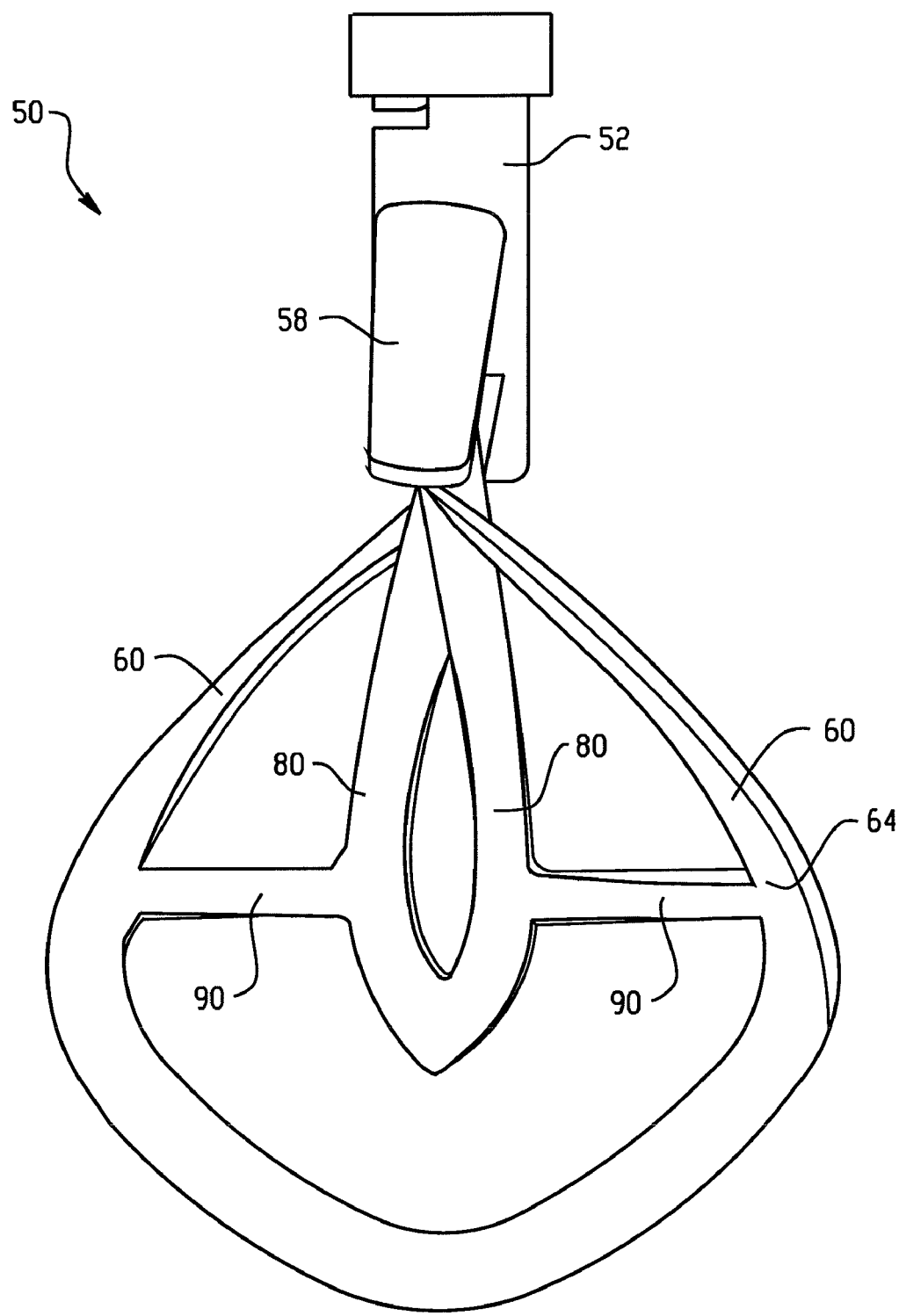
FIG. 10 is a side view of the beater of FIG. 6.

Referring to FIGS. 6-10, another embodiment is illustrated in which a beater 50 includes a centrally located upper attachment portion 52 that defines a longitudinal axis 54 of the beater. The attachment portion 52 includes an upper opening 56 to facilitate connection to a mixer shaft. A pair of oppositely disposed stabilizing arms 58 extend outward from the attachment portion, and may be angled downward. Outer blades 60 meet at the rotational axis 54 of the beater below at a location 62 spaced below the attachment portion 52. The leading face 64 of each blade lies in a generally upright plane at such location 62. As the blades 60 move radially outward from the axis 54 and upward from location 62, they curve such that leading face begins to transition from a substantially vertical orientation (i.e., substantially parallel with axis 54) toward a downwardly angled facing orientation at a point of connection toward the distal ends of the arms 58. As best seen in FIG. 10, in the illustrated embodiment the face 64 angles downward at an angle of between about 40 and 50 degrees relative to horizontal, though variations are possible such as about 30 degrees. As seen in FIG. 8, as the blades 60 move away from the axis 54, they also move away from the plane in which both the axis 54 and an arm axis 70 lie. As best seen in FIG. 10, such movement away from the defined plane continues until the blades 60 have moved upward toward the attachment portion by about 30% to 50% of the total vertical distance from location 62 to the height of the attachment on the arms 58, at which point the blades begin to move back toward the plane.

A smaller, inner set of blades 80 are also provided, with the lower end of blades 80 meeting at location 82 and the upper ends of blades 80 attached to the arms 58 at intermediate locations thereon. In the illustrated embodiment, the leading face of the blades 80 is substantially vertically oriented at location 82 (FIGS. 6 and 7) and begins to angle downwardly as the blade moves radially outward from the axis 54 and upward toward the arms 58, though the downward angle of the leading face of blades 80 is much less than that of outer blades 60. Moreover, the leading face of the blades 80 becomes substantially vertically oriented again near the arms 58. Also shown are attachment struts 90 between the outer blades 60 and the inner blades 80. The downward angle of the leading face of such struts 90 increases when moving from the inner blade 80 to the outer blade 60.

The blade configuration tends to produce a mixing pattern in which material moves upward at the outer portions of the beater (via the two outer blades) and then inward and downward. The inner blades provide rotation and whirled or spiraling movement of material closer to the rotational axis of the beater. The overall mixing pattern thus produces both rotational movement of material about the beater axis, and a flow of material that is generally upward along the outer portion of the beater, then inward and then generally downward along the central portion of the beater (e.g., nearer to the beater axis).

In the embodiment of FIGS. 6-10, intended direction of rotation of the beater is clockwise when looking downward along the beater axis per FIG. 8. Such clockwise motion (along with planetary or orbital motion) can provide a material flow similar or at least substantially the same as the material flow depicted by FIG. 5 and described above.

The above described beaters can provide not only both rotational and radial movement of material during a mixing operation, but can also impart a degree of axial movement of the material. Axial motion can bring material from one end of the beater to the other end, as in top-to-bottom motion for a vertically mounted beater. This combined mixing action can reduce the amount of time required for initial uniformity, can increase the suspension of the materials that tend to settle and can provide greater uniformity as additions are made to the existing material in the vessel.

It is to be clearly understood that the above description is intended by way of illustration and example only and is not intended to be taken by way of limitation. For example, the number of rows of blades and the width or shape of the individual blades can be selected for a number of reasons. The number of rows of blades in combination with blade width establishes what is sometimes referred to as solidity of the beater with respect to the area swept around the axis of rotation. Increased solidity means that the mixed fluid travels around or is moved by more points or areas of contact. Provided such contact does not cause the mixed material to rotate en masse, the result of greater solidity can be more rapid mixing. Because the cross-sectional area swept by the inner blades is typically less than the area swept by the outer blades, the inner blades may be greater in number, wider and/or mounted at a steeper angle than the outer blades to impart an amount of axial motion similar to the axial motion imparted by the outer blades. In some embodiments, an appropriate blade width (inner and/or outer blades) can be selected for a given mixer drive to handle a desired and acceptable range of fluid properties such as density, viscosity or apparent viscosity for non-Newtonian fluids, yield stress for fluid motion, elasticity of doughs, particle interactions in pastes or slurries and other fluid characteristics affecting motion. Blade shape may be chosen for a variety of reasons, including ease of fabrication, strength, flow patterns around the blade, avoidance of areas of stagnation around the blade, or other mechanical or fluid dynamics reason. Other changes and modifications could be made, including both narrowing and broadening variations and modifications of the appended claims.

What is claimed is:

1. A beater for a mixer, the beater comprising:
   a shaft including a mixer attachment portion, the shaft defining a rotational axis of the beater;
   a first stabilizing arm extending outwardly from the shaft;
   a second stabilizing arm extending outwardly from the shaft and spaced circumferentially from the first stabilizing arm;
   a first blade having an upper end connected to the first stabilizing arm at a location spaced from the shaft, a lower end located proximate the rotational axis of the beater and a leading face that transitions from a substantially vertical orientation at the lower end to a downwardly angled orientation at the upper end; and
   a second blade having an upper end connected to the second stabilizing arm at a location spaced from the shaft, a lower end located proximate the rotational axis of the beater and a leading face that transitions from a substantially vertical orientation at the lower end to a downwardly angled orientation at the upper end;
   a third blade having an upper end connected to the first stabilizing arm at a location spaced from the shaft and inward of the upper end of the first blade, the third blade including a lower end proximate the rotational axis and spaced upward from the lower end of the first blade, the third blade including a leading face that transitions from a substantially vertical orientation at the lower end to a downwardly angled orientation at the upper end; and
   a fourth blade having an upper end connected to the second stabilizing arm at a location spaced from the shaft and inward of the upper end of the second blade, the fourth blade including a lower end proximate the rotational axis and spaced upward from the lower end of the second blade, the fourth blade including a leading face that transitions from a substantially vertical orientation at the lower end to a downwardly angled orientation at the upper end; the first and second stabilizing arms extend parallel to a plane in which the rotational axis lies; the first and third blades extend away from the plane to a first side of the plane; and the second and fourth blades extend away from the plane to a second side of the plane.

2. The beater of claim 1, wherein the first stabilizing arm is diametrically opposed to the second stabilizing arm.

3. The beater of claim 1, wherein the lower ends of the first and second blades meet at the rotational axis.

4. The beater of claim 1, wherein the lower ends of the first and second blades are connected to a lower portion of the shaft.

5. The beater of claim 1, wherein the leading face angles downward at the upper end at an angle of between about 40 degrees and about 50 degrees relative to a horizontal plane that is perpendicular to the rotational axis.

6. The beater of claim 1, wherein the lower ends of the third and fourth blades meet at the rotational axis.

7. The beater of claim 1, wherein the lower ends of the fourth and third blades are connected to the shaft.

8. A beater for a mixer, the beater comprising: a shaft including a mixer attachment portion, the shaft defining a rotational axis of the beater; a first stabilizing arm extending outwardly from the shaft; a second stabilizing arm extending outwardly from the shaft and spaced circumferentially from the first stabilizing arm; a first outer blade having an upper end connected to the first stabilizing arm at a location spaced from the shaft and a lower end positioned proximate the rotational axis; a second outer blade having an upper end connected to the second stabilizing arm at a location spaced from the shaft and a lower end positioned proximate the rotational axis; a first inner blade having an upper end connected to the first stabilizing arm at a location spaced from the shaft and inward of the upper end of the first outer blade, the first inner blade includes a lower end positioned proximate the rotational axis; and a second inner blade having an upper end connected to the second stabilizing arm at a location spaced from the shaft and inward of the upper end of the second outer blade, the second inner blade includes a lower end positioned proximate the rotational axis; wherein the first outer blade, second outer blade, first inner blade and second inner blade include respective leading faces shaped and configured to cooperate during use to produce a mixing pattern in which material being mixed moves upward along the first and second outer blades and then inward and downward along the first and second inner blades; the first and second stabilizing arms extend parallel to a plane in which the rotational axis lies; the first outer and first inner blades extend away from the plane to a first side of the plane; and the second outer and second inner blades extend away from the plane to a second side of the plane.

9. The beater of claim 8, wherein the respective leading face of each of the first and second outer blades transitions from a substantially vertical orientation at the lower end of the respective outer blade to a downwardly angled orientation at the upper end of the respective outer blade.

10. The beater of claim 9, wherein the respective leading face of the first and second inner blades transitions from a substantially vertical orientation at the lower end to a downwardly angled orientation at the upper end.

11. The beater of claim 8, further comprising a first attachment strut that connects the first outer blade to the first inner blade and a second attachment strut that connects the second outer blade to the second inner blade.

12. The beater of claim 11, wherein the first attachment strut and second attachment strut each have a respective a leading face having a downward facing orientation that varies when moving outward from the rotational axis.

13. A beater for mixing food product, the beater comprising: a shaft including a mixer attachment portion, the shaft defining a rotational axis of the beater; a first stabilizing arm extending outwardly from the shaft; a second stabilizing arm extending outwardly from the shaft and substantially diametrically opposed to the first stabilizing arm such that both the first stabilizing arm and the second stabilizing arm extend parallel to a plane in which the rotational axis lies; a first blade having a lower end positioned proximate the rotational axis, an upper end connected to the first stabilizing arm at a location spaced away from the shaft, wherein the lower end of the first blade is proximate the plane, the first blade extends away from the plane, to a first side of the plane, moving upward from the lower end and then extends back toward the plane at the upper end, the first blade having a leading face that starts to transition to a downward facing orientation as the first blade moves away from the plane; a second blade having a lower end positioned proximate the rotational axis, an upper end connected to the second stabilizing arm at a location spaced away from the shaft, wherein the lower end of the second blade is proximate the plane, the second blade extends away from the plane, to a second side of the plane, moving upward from the lower end and then extends back toward the plane at the upper end, the second blade having a leading face that starts to transition to a downward facing orientation as the second blade moves away from the plane; a third blade having a lower end positioned proximate the rotational axis, an upper end connected to the first stabilizing arm at a location spaced away from the shaft, wherein the lower end of the third blade is proximate the plane, the third blade extends away from the plane, to a first side of the plane, moving upward from the lower end and then extends back toward the plane at the upper end; and a fourth blade having a lower end positioned proximate the rotational axis, an upper end connected to the second stabilizing arm at a location spaced away from the shaft, wherein the lower end of the fourth blade is proximate the plane, the fourth blade extends away from the plane, to a second side of the plane, moving upward from the lower end and then extends back toward the plane at the upper end; the lower ends of the third and fourth blades are spaced upward from the lower ends of the first and second blades respectively.

14. The beater of claim 13, wherein the lower ends of the first and second blades meet at the rotational axis.

15. The beater of claim 13, wherein the lower ends of the first and second blades are connected to a lower portion of the shaft.

16. The beater of claim 13, wherein the first and second blades each have a leading face that angles downward at the upper end at an angle of between about 40 degrees and about 50 degrees relative to a horizontal plane that is perpendicular to the rotational axis.

17. The beater of claim 13, wherein the lower ends of the third and fourth blades meet at the rotational axis.

* * * * *